United States Patent [19]

Goszyk

[11] Patent Number: 4,938,599
[45] Date of Patent: Jul. 3, 1990

[54] NON-CONTACT OPTICAL GAUGE

[75] Inventor: Kurt A. Goszyk, Washington Crossing, Pa.

[73] Assignee: Contrologic, Inc., Norristown, Pa.

[21] Appl. No.: 203,433

[22] Filed: Jun. 7, 1988

[51] Int. Cl.⁵ .............................................. G01B 11/08
[52] U.S. Cl. ..................................... 356/387; 250/560; 364/560; 364/571.04; 378/54
[58] Field of Search ............... 356/384, 385, 386, 387; 250/560; 364/560, 562, 563, 571.04; 378/50, 54, 55

[56] References Cited

U.S. PATENT DOCUMENTS

| | | |
|---|---|---|
| 3,874,798 | 4/1975 | Antonsson et al. ................. 356/159 |
| 3,905,705 | 9/1975 | Petrohilos ............................ 356/160 |
| 3,955,072 | 5/1976 | Johannsmeier et al. ........ 235/151.11 |
| 4,037,968 | 7/1977 | King et al. ........................... 356/160 |
| 4,082,463 | 4/1978 | Dehait et al. ........................ 356/387 |
| 4,097,158 | 6/1978 | Dehait ................................. 356/160 |
| 4,101,612 | 7/1978 | Barker et al. ......................... 264/22 |
| 4,152,767 | 5/1979 | Laliotis ................................ 364/560 |
| 4,168,126 | 9/1979 | Altman et al. ...................... 356/386 |
| 4,269,514 | 5/1981 | Vossberg ............................. 356/387 |

FOREIGN PATENT DOCUMENTS

| | | | |
|---|---|---|---|
| 49202 | 3/1987 | Japan .................................. 356/385 |
| 2199138 | 6/1988 | United Kingdom ................ 356/386 |

OTHER PUBLICATIONS

"Operating & Service Manual for the Milmaster Electronic Micrometer Model SWGH-10R", Electron-Machine Corp., Umatilla, Fla. (1980).
"SPEC Machine Vision & Control Systems", Target Systems, Inc., Salt Lake City, Utah (undated).
Simonson et al., "Advances in Instrumentation: Optical Detection of Surface Flaws", I.S.A., vol. 38–part 2. (1983).
Taylor, "Using a Laser Micrometer for Precision Control of Wire Diameter and Position of CV Line", pp. 326–329 (undated).
Single Plane; BETA Better by Design, The Compact Series: BETA-COMPAGAGE ©; Bulletin 7.0–Feb. 88, printed in England (2 page advertisement).

Primary Examiner—F. L. Evans
Attorney, Agent, or Firm—Woodcock Washburn Kurtz Mackiewicz & Norris

[57] ABSTRACT

Non-contact gauges and methods of optical measurement are provided which include storing a signature indicative of an error associated with measuring a known dimension and then determining an unknown dimension in relation to this signature. The novel technique enables low cost production of preferred gauge designs using standard, off the shelf components. The non-contact gauge includes a radiation source directed toward the object to be measured and a scanning device, preferably a rotating drum having small slits disposed therethrough, for producing a signal responsive to an image produced by the radiation source upon the object. The device is capable of having a resolution of about 0.0001 inches and an accuracy of about +/0.00025 inches. The device can include a nuclear radiation source, such as X-ray radiation, for determining wall-thicknesses. The designs disclosed further produce cross-sectional images of solid and hollow objects.

44 Claims, 9 Drawing Sheets

X₁ ⎍
SHADOW WIDTH

FIG. 1B

X₂ ⎍
SHADOW WIDTH

E AND F GENERATED THE SAME AS IN FIG. 9B

FIG. 9C GLASS(OR TRANSPARANT OBJECT) AND ITS CORRESPONDING SHADOW

NON-CONTACT OPTICAL GAUGE

FIELD OF THE INVENTION

This invention relates to non-contact optical measurement gauges used in-line, real time processes, experimentally on a bench, or as part of a quality control measure.

BACKGROUND OF THE INVENTION

Several optical, non-contact gauges presently exist. These gauges typically measure the outside diameter of wire, tubing, fibers, cylinders, small plates and other objects whose outside dimension is of interest. The non-contact feature is important where the object can easily be deformed using ordinary contact caliper devices. High accuracy, repeatability and resolution are also prime features of these non-contact optical gauges. These devices often employ a shadow cast technique whereby a collimated white light of parallel rays or other radiation source is interrupted by the object to be measured. The interrupted light or shadow, along with its surrounding light, are cast upon a light sensing element which discriminates between them. The discrimination technique usually measures total amplitude differences as a function of the presence or absence of radiation in time.

Shadow cast and shadowgraphy have been, in the past, used in the machine tool industry to visually inspect parts such as screw threads. By placing the part in front of a light projector, the part's shadow would be enlarged on a wall or screen for easier inspection by the eye. In today's non-contact optic gauges, the same principle applies, except that the projected light is collimated and an electronic sensor acts as the screen.

The radiation sources which are currently available for such gauges are generally of two types: the constant incandescent sources and highly focused laser beams. In the incandescent version, a light source can be collimated by shining it through a pin hole and then through an objective lens. A parallel light emerges which provides a shadow when disposed on the object to be measured. In some gauges, the relative intensity of the light as a function of the shadow provides an analog means of determining the outside dimension. In other gauges, mechanical shutters are moved to scan the dark and light area in time. In others the on/off state of a photo diode array is used.

With respect to laser beam devices, gauges have been known to include a laser beam for striking a rotating mirror which, in-turn, fans out the beam through an objective lens. See Petrohilos, U.S. Pat. No. 3,905,705, which is hereby incorporated by reference. This results in a fast moving parallel beam across an object to be measured. The receiving sensor of such devices, as in the case of the incandescent versions, measures relative radiation strength or a time varying proportional signal.

In such prior art methods described above, the mechanical alignment of the optics, mirrors, shutters, sensors and/or radiation sources is critical. Consequently, precision manufacturing fixtures and techniques are generally required. High quality optical material and sophisticated sensors and circuitry are employed to prevent non-linearities in the measurement. Even with these precautions, inaccuracies, and non-linearities still exist to a certain degree. Several patents address further compensation means to reduce these remaining inaccuracies. But these usually require additional or secondary hardware and sensors to compensate for the inherent inaccuracies. Finally, heat generated by the incandescent or laser sources and the measurement and compensation circuitry requires extensive heat sinking and isolation. Often, an abundant power source, which in turn generates considerable heat, is required to feed the radiation source and electronics. The resultant high heat is wasteful and affects instrument accuracy over time.

Accordingly, there is a need for a less expensive and more efficient non-contact optical gauge which compensates for inherent inaccuracies and non-linearities of the optical system. Secondly, there is also a need for a low heat design for such instruments that is compact in size and requires little or no maintenance.

SUMMARY OF THE INVENTION

Optical non-contact gauges and methods of non-contact measurement are provided by this invention. The gauge designs are easy to manufacture and include low cost scanning systems. The invention further includes the benefits of low production cost for equivalent function, lower power requirements, little or no maintenance and compact size.

These benefits are achieved by providing a non-contact, optical device including means for storing a signature indicative of one or more optical device errors in measuring a known dimension, and then determining an unknown dimension in relation to this signature. The non-contact, optical device further includes a radiation source which can be directed to an object to produce an image on a scanning device. The scanning device, in turn, produces a signal responsive to the image, which is picked up by a processor to produce an output indicative of the dimension of the object in relation to the signature previously memorized.

The low product cost for the preferred gauges is due to a very easy to produce scanning mechanism and non-critical alignment. Previously employed expensive mounting and optic components are replaced with low cost components and compensation software. Low power and virtually maintenance-free service is achieved through the use of a preferred long life, solid state infrared light source, and highly reliable CMOS microelectronics. These gauges also allow the user to add features in the field with preferred option modules.

Accordingly, an inexpensive and low heat device is provided having resolutions of about 0.0001 inches and an accuracy of about +/−0.00025 inches. The non-contact optical gauge produced pursuant to this invention, can measure, for instance, the outside diameter of either fixed or moving materials to a high degree of accuracy. Such materials as wire, tubing, fibers, cables, cylinders, pipes, spheres, plates, rotating shafts and other products are measurement candidates for this type of gauge. In a preferred embodiment of this invention, nuclear radiation, such as X-Ray radiation can be employed in combination with a X-Ray sensitive sensor to determine wall-thicknesses of objects having interior cavities or openings. Thus, cross-sectional images of objects can be displayed during real time processing or manufacturing.

Other features of this invention include a U.S. or metric display, glass logic options for measurement of transparent rods, and R.S. 232 and R.S. 422 communication capability. Analog outputs to the process control equipment, remote displays, chart recorders, relay contact interfaces and optical communication devices can be added to the devices using plug-in option modules. Finally, gauges produced pursuant to this invention can accurately measure objects which are skewed at an angle, displaced horizontally or vertically or which are in constant motion, such as during drawing and extrusion operations.

OBJECTS OF THE INVENTION

It is, therefore, an object of this invention to provide low cost, non-contact optical gauges.

It is another object of this invention to provide non-contact optical gauges for providing a high degree of accuracy with lower power requirements and little maintenance upkeep.

It is still another object of this invention to provide non-contact optical gauges having a non-critical optical alignment and the ability to compensate for optical, mechanical and/or electrical errors.

It is still another object of this invention to provide methods for measuring a dimension or cross-section of an object while correcting for errors associated with the measurement by comparing the measured output with a signature indicative of an error associated with measuring a known dimension.

With these objects in view, this invention resides in the novel construction, combination, arrangement of parts and methods substantially as hereinafter described and more particularly defined by the attached claims.

BRIEF DESCRIPTION OF THE DRAWINGS

The accompanying drawings illustrate a complete embodiment of the invention according to a preferred mode so far devised for the practical application of the principles thereof, and in which.

DETAILED DESCRIPTION OF THE INVENTION

Novel non-contact, optical gauges and procedures are provided by this invention which preferably incorporate optics, scanner, and microprocessor electronics. These embodiments ideally comprise a low cost drum scanner, compensation software to correct for mechanical misalignments, electronic circuit tolerances and non-linear optics within the gauge. They also include procedures for tolerating an object's misalignment along the measurement axis and for correcting for imperfect collimation and optional plug-in modules which allow the user to add features in the field. The most preferred compact constructions of this invention include a measurement unit, built-in electronics and a built-in display.

Generally, the optical gauge of this invention includes storage means for memorizing a signature indicative of an error associated with measuring a known dimension, radiation source means for directing radiation upon an object, and scanning means for receiving an image of the object produced by the radiation for producing a signal responsive to the image. The scanning means is designed to produce a signal which is introduced to a processing means for producing at least an output which is indicative of the dimension of the object. An important aspect of this invention, the processing means determines the output in relation to the signature memorized by the storage means. This method also includes memorizing a signature indicative of an error associated with measuring a known dimension, directing radiation upon an object and receiving an image of the object produced by the radiation. The method next provides a signal responsive to the image and processes this signal to provide at least an output which is indicative of the dimension of the object. As in the case of the optical gauge, this method determines the dimensional output in relation to a stored signature.

The radiation source means for the methods and devices of this invention can include any one of a number of sources including white light, laser light, ultraviolet, infrared and nuclear radiation, such as X-ray. In the most preferred gauge 100 shown in FIG. 1, the radiation source means employs an infrared LED radiation source 10 due to its availability, low power requirements and low heat generation. The radiation source means of this invention can further comprise collimation means for collimating radiation. Generally, the collimation means comprises means for producing parallel radiation, and may further include condensing means for condensing the radiation produced by the radiation source means. The condensing means can include a plurality of condensing lenses, and more preferably comprises at least one objective lens. In the most preferred embodiments, the infrared radiation passes through lens 20 which represents the condensing system. This condensing system, in conjunction with objective lens 30, form a collimator. The collimator produces a parallel bundle of radiation which simulates a radiation source at an infinite distance. This parallel bundle of radiation is directed to the object 40 to form an image 50 of the object which is received by the scanning means.

Figure 1:
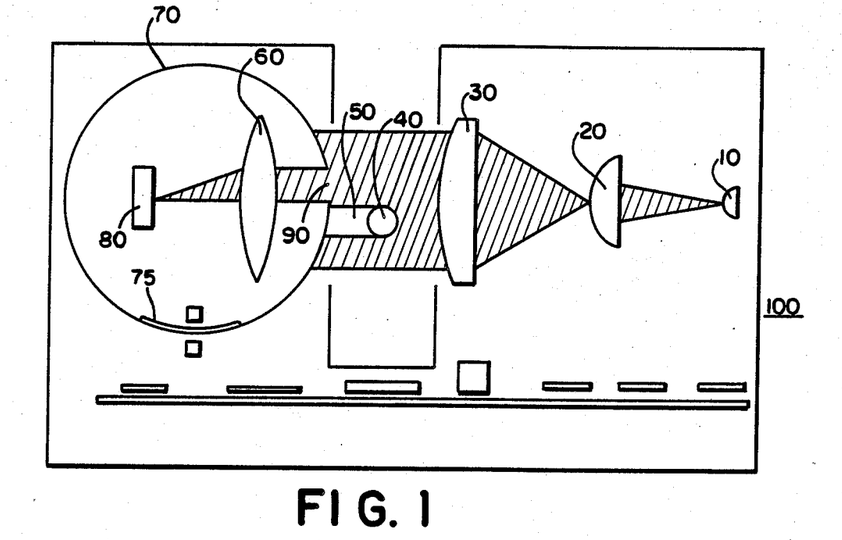
FIG. 1 is a diagrammatic, side-view of a preferred non-contact optical gauge pursuant to this invention.

The preferred scanning means of this invention, as further described in FIG. 1, comprises a vertically rotating drum 70. The drum 70 can comprise a horizontal slit 90, two slits, which can be placed approximately opposite each other on the vertically rotating drum 70 or a plurality of slits arranged in regular or irregular fashion. The slits can be angled with respect to an axis of rotation for the drum, angularly disposed in opposite directions to one another, and/or placed apart on the drum 70, e.g. 90°, 120° or 180° apart. In addition to the above, the scanning means further can comprise receiver means for receiving radiation transmitted through the scanning means. The receiver means preferably comprises a photodetector, and more preferably an infrared photodiode sensor 80. A focusing lens 60 can also be employed for focusing the light transmitted through the preferred aperture or slit configuration onto the receiving means.

In the most preferred embodiment, the drum comprises a very small horizontal slit which moves through the parallel bundle of radiation in a preferred, non-linear fashion. When an object is placed within the radiation window, it casts a shadow across the preferred scanning drum. In the most preferred gauge 100, a low cost drum scanner revolves perpendicularly to the measurement axis. This allows the small slit in the drum to be placed inexpensively across the side of drum, parallel to the rotation axis.

Figure 3:
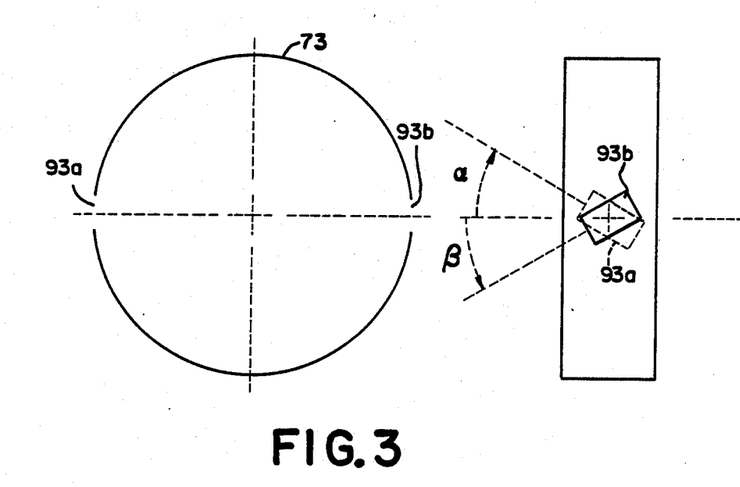
FIG. 3 includes diagrammatic front and side views of a preferred drum scanner having angularly disposed slits for measuring a dimension of an object which is skewed with respect to a measurement axis.

In an important aspect of this invention, as described in FIG. 3, the gauge can compensate for objects which are skewed at angles along the measurement axis by employing two slits 93a and b placed opposite each other on the drum 73 sides. Each slit preferably is angled slightly along the axis of rotation of the drum 73, represented by angles α and β but in the opposite direction to its complementary one. The readings taken when each of the two slits passes through the measurement window are averaged by the microprocessor electronics. This permits an object under measurement to be skewed within the maximum angles α and β of the two slits and still give an accurate reading.

The preferred gauge and methods of this invention employ the principle of shadow measurement to determine the outside dimension, circumference or cross-section of an object 40 under measurement. As the preferred drum rotates, the sensor will be turned on during areas of radiation and will be turned off during the shadow, or darker image, in the case of a transparent or translucent object.

Figure 6:
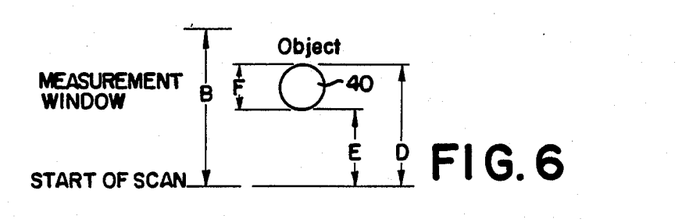
FIG. 6 is a diagrammatic view of an object to be measured and a measurement window of this invention, illustrating dimensions associated with timing signals for the preferred device.
Figure 7:
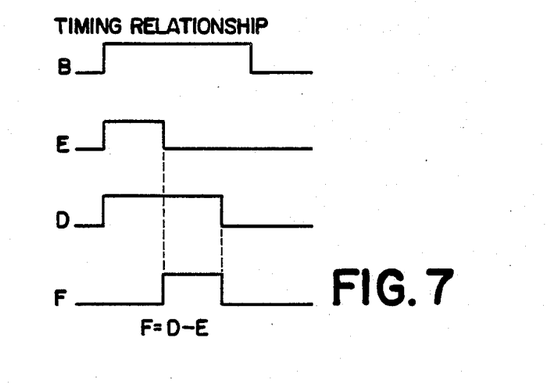
FIG. 7 is a diagram of the timing logic associated with the dimensions of FIG. 6 which determine signals to be fed into counters of the preferred hardware circuitry.

The shadow is converted by the circuitry into a number of counts. The number of counts are processed by the processing means, preferably a microprocessor, using mathematical relationships established during a "learning mode" into a corresponding outside dimension measurement display. The drum 70 of the preferred sensor means can include a flange 75 which passes through a timing interrupter, e.g. optical or magnetic, for determining the on-time of the measurement window. This facilitates starting and resetting the timing logic. In the most preferred embodiments of this invention, the resultant conditioned signals can be processed by the timing logic of this invention to provide three signals as described by FIGS. 6 and 7. The first signal (B) is the total measurement window on-time enable. The second signal (E) is the counter enable from the beginning of the measurement window to the leading edge of the object 40. The third signal (D) is the counter enable from the beginning of the measurement window to the trailing edge of the object 40. These enable signals are later fed into three counters. As described in FIG. 7, the timing relationship corresponds to the physical measurement window. The signal (F) is actually derived from the difference between E and D in the microprocessor. E is the position of the object in the measurement window and F is the relative dimension of the object. Therefore, signals E and F are two important signals used by the compensation software of this invention.

The processing means of this invention will now be described. As can be determined from FIG. 6, the distance across the radiation window "B" can be described as a linear measurement. However, the drum slit 90, being disclosed in a preferred angular relation to the axis of rotation for the drum, travels according to a trigometric SIN of the angle across the radiation window. Accordingly, a non-linearity exists which must be compensated for. In addition, the lens 60, sensor 80, and the collimation means as a whole, have alignment tolerances which must be overcome. It should be noted, that even though the vertical drum is one source of non-linearity, other embodiments of this invention contain multiple sensors, mirror combinations, linear photodiode sensor arrays, or CCD arrays, and still have alignment tolerance considerations. Other anomalies of the gauge which can create error in the final measurement include: optical misalignment of the lenses which are not in true alignment with each other, optical impurities in the lenses themselves, inconsistencies in the index of refraction among lenses, collimation errors (not true parallel light bundles), misalignment of radiation source or sensor position, scanner mechanisms off center or not in line with the light path, tolerances in the sensor signal conditioning electronics, variations in the radiation source output power, irregular curvature of the scanning drum, wobble in the scanning drum rotation, variations in the rotational speed of the scanning drum, reduction in the amount of radiation passing around the object to the sensor (particularly larger objects), vibration or skewing of the object, and errors associated with image processing to create a cross-sectional representation when using a multiple plane construction.

These and other anomalies are addressed in a "learning mode" which can be employed during the manufacture of each individual gauge. Specifically stated, once a gauge is built it can be placed into a mode where it samples known parts with a range of outside dimensions and at different vertical positions in the radiation window. By using novel signal processing techniques, a signature of one, some, or substantially all the mechanical and optical anomalies of that particular gauge is created. This signature is preferably stored in the memory of the microprocessor circuitry. In operation, the corrected output of the device is constantly determined in relation to the signature signal. Through a mathematical adjusting algorithm, or equivalent means, a correct accurate outside, or other, dimension is displayed.

Figure 4A:
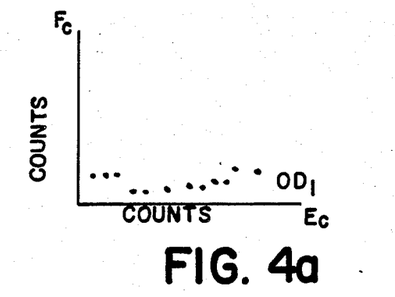
FIG. 4(a)–(c) are sets of curves representing optical signatures derived from measuring known dimensions.
Figure 4B:
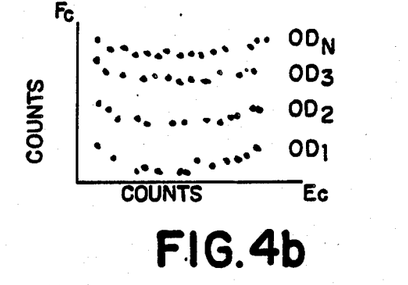
Figure 4C:
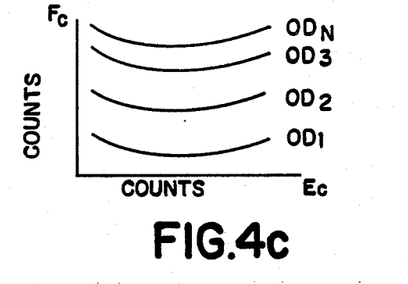

The signature preferably is created by gathering data points and curves as described substantially in FIGS. 4(a)-(c). The data points consist of position timing counts Ec and dimension timing counts Fc as the drum rotates. The preferred processing means includes a free running oscillator and counters which are enabled when the sensor sees radiation and disabled during a shadow or diminished radiant image. It can be seen that the resolution of the measurement is depended upon the frequency of the oscillator and the time duration of the scanning drum slit through the radiation window. For example, if a 1" radiation window was scanned and the counter counted 50,000 oscillations during that period, the measurement resolution would be 1" divided by 50,000, or 0.00002".

For a vertically rotating drum, the vertical position of the object to be measured in the radiation window as well as its outside diameter must be known. Two counters are preferred. One counter counts from the start of the radiation window to the start of the object's shadow. The second counter counts from the start of the radiation window to the end of the object's shadow. The difference between these two counters is the effective number of counts during the object's shadow. To visualize this more clearly, a graph illustrating a position starting count Ec vs. shadow width count Fc can be plotted for a range of starting counts, as depicted in FIG. 4(a). As the diameter of the object 40 to be measured changes, a family of curves, described by FIGS. 4(b) and (c), relating to the true outside diameter can be plotted on such graphs. Accordingly, the "learning mode" creates a signature. The microprocessor, or processing means, plots the graph internally as a mathematical relationship. The technique is commonly referred to as polynomial curve fitting or regression; that is, creating a polynomial equation to represent an empirically gathered set of data points. Several curve fitting techniques can be used, including but not limited to, orthogonal polynomial curves, Bezier curves or B-splines. Alternatively, a data look-up table approach can be used instead of linear regression.

Once a set of unique equations or tables has been created for a particular gauge, they are preferably stored into a non-volatile RAM memory as a series of coefficients representing equations and/or curves. These provide the signature of the gauge throughout its useful life. A calibration switch can be provided for field adjustment to move the entire signature up or down for environmental fine tuning. During operation, the count read from the object under measurement is entered into the set of simultaneous equations wherein the resultant outside diameter is calculated. The benefit of this technique is the ability to use relatively low cost optical parts, molded plastic support structures, less stringent alignment and manufacturing fixturing, and low level assembly labor. Hence a gauge of equivalent accuracy can be manufactured for one third to one fourth of the cost of conventional gauges.

Figure 2:
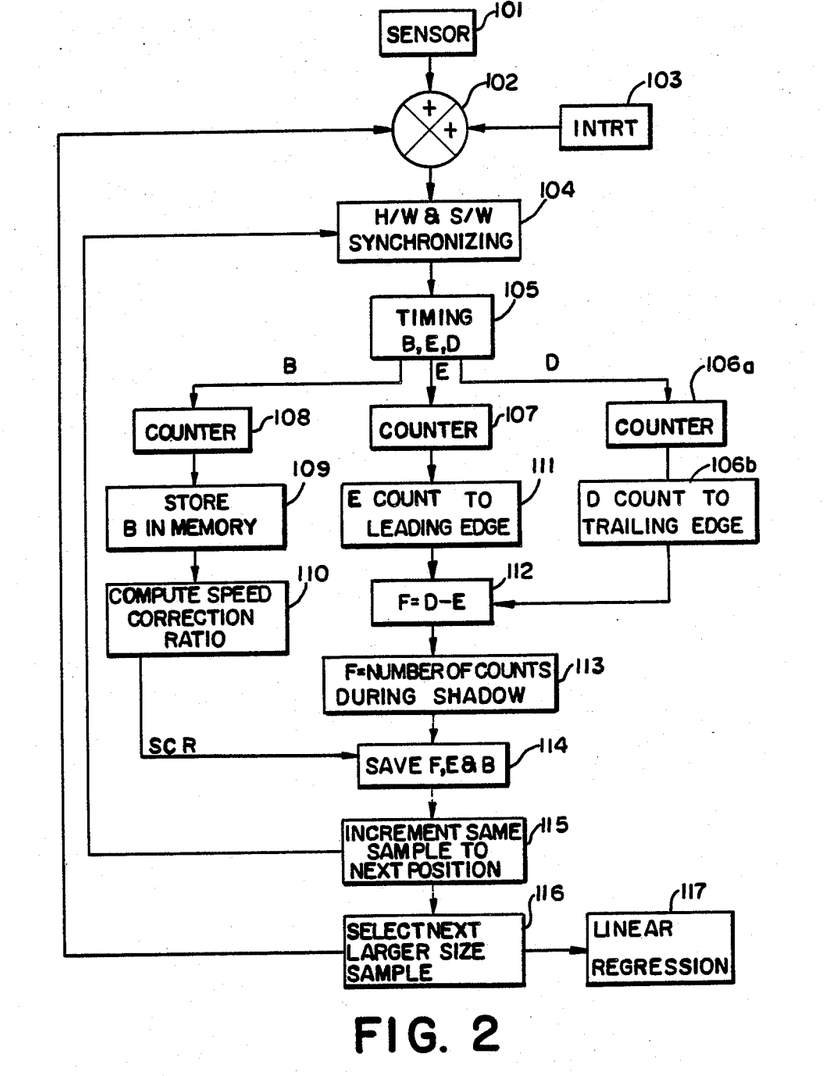
FIG. 2 is a block diagram for the preferred learning mode of this invention where a signature is determined by measuring known dimensions.

Referring now to the flow diagrams of FIGS. 2 and 10, both the preferred learning mode and operation mode will be described. With respect to the learning mode, the sensor 101 and interrupter 103 are conditioned, amplified and squared at step 102. The resultant signals are processed by the hardware and software synchronizing step 104 and by timing logic 105 to produce three signals: B, E, and D, which are fed into three counters 106, 107, and 108. Counter 108 then feeds the signal to step 109 for storing B into the memory. This in turn, triggers step 110 to compute a speed correction ratio. The speed correction ratio compensates for inaccuracies in the rotation of the scanning drum due to motor anomalies. During the learning mode, the speed for the motor is memorized and given an appropriate value. During the operation mode, this value is compared to an actual speed value. If the two values are different, the interpolation algorithm corrects for the deviation. Referring again to FIG. 2, the signal defined as E enters counter 107 wherein a count from the start of the measurement window to the leading edge of the object's shadow is measured at 111 and fed into computing step 112. The signal defined as D (start of measurement window to trailing edge of object's shadow) is fed into counter 106a and then a count to the trailing edge is measured at step 106b and introduced into the computer algorithm of step 112. The number of counts during the shadow, as represented by signal F, is calculated at step 113, and then the counts for F, E and B are stored at step 114. The learning mode then increments the same diameter sample to the next position, horizontal or vertical, at step 115 to develop a series of points representing a particular diameter or outer dimension, as illustrated by example $OD_1$ of FIG. 4(b) and (c). Next, a larger size sample is introduced at 116 to the learning mode and the iterations are repeated to develop a curve as represented by $OD_2$ of FIGS. 4(b) and (c). Subsequent samples can be introduced at 116 to produce similar curves $OD_3$ through $OD_n$. The indications for counts in FIG. 4(b) can be fitted to a curve using the linear regression technique of step 117, as further illustrated by FIG. 4(c).

Figure 10:
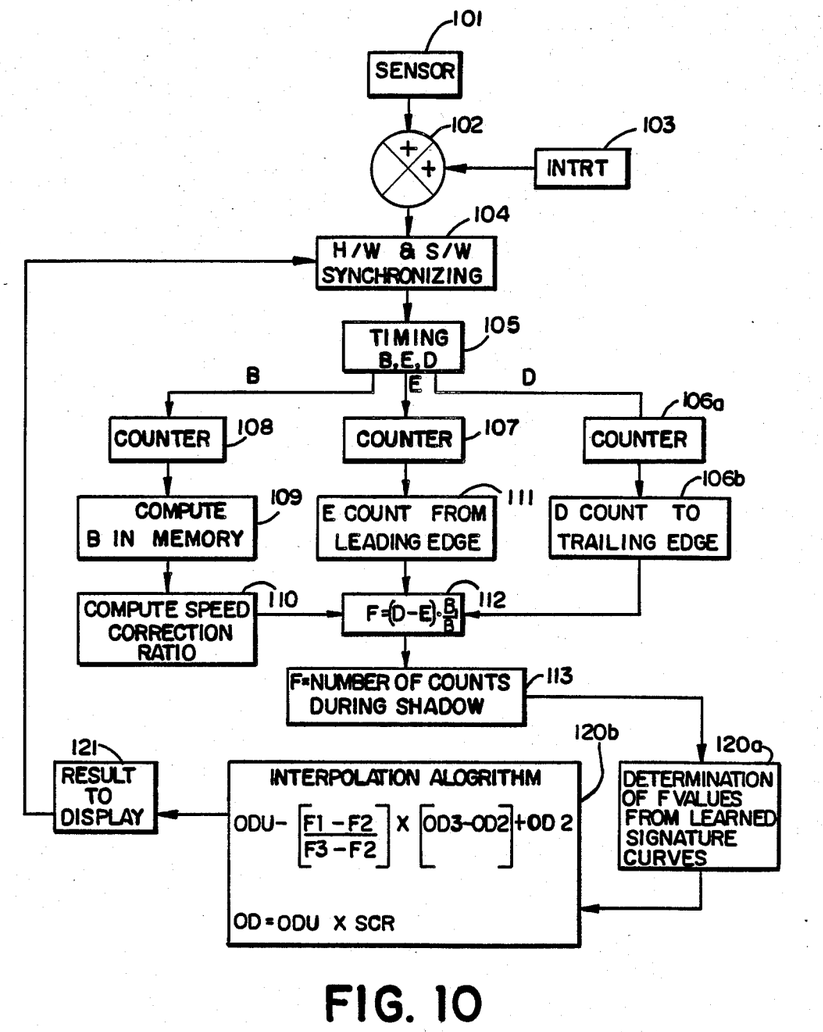
FIG. 10 is a block diagram representing the operation mode flow chart for the preferred non-contact optical gauge.
Figure 11A:
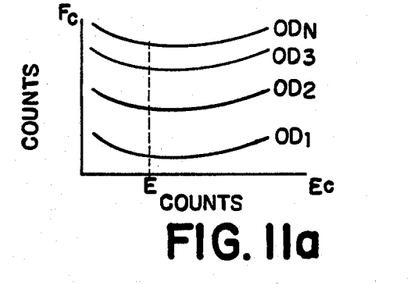
FIG. 11(a)–(c) represents the plotting of a count read for an object under measurement with respect to sets of polynomial equations which represent learned object dimensions.
Figure 11B:
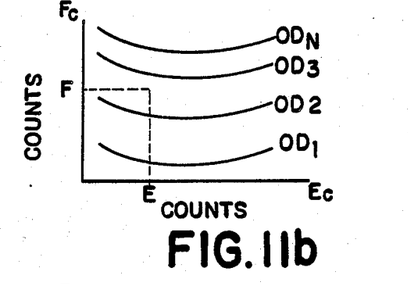
Figure 11C:
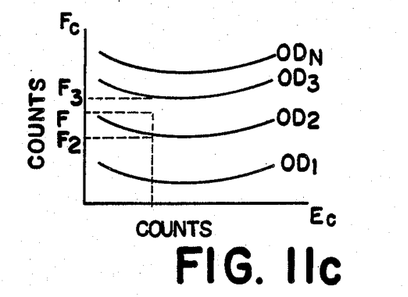

As described by the flow chart of FIG. 10, the operation mode generally corresponds to the steps for the learning mode, with the exception that the output of step 110 is fed into 112 and step 113 is fed into the determination and interpolation algorithms of step 120 a and b, wherein novel compensation software compares the signature of the non-linearities and misalignments in the system determined during the learning mode and corrects for them to provide a dimensional reading which can be displayed during step 121. This algorithm is graphically displayed in FIGS. 11(a)–(c) for selected E values.

Figure 5:
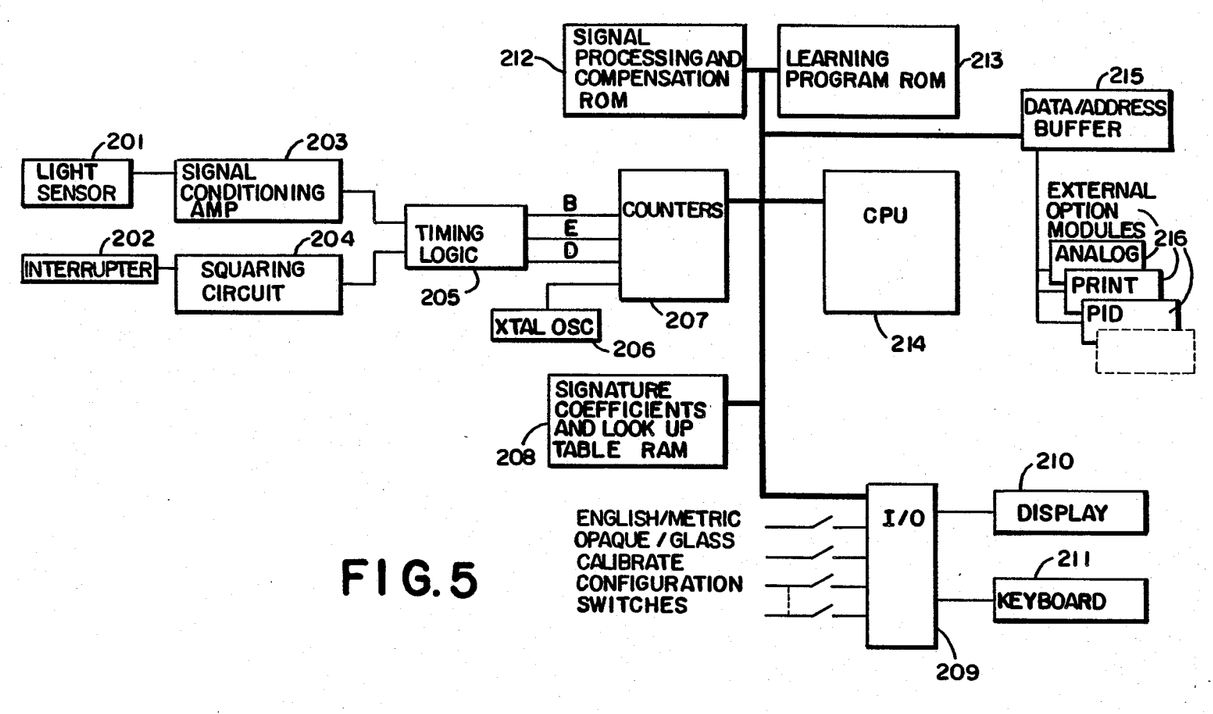
FIG. 5 is a block diagram for the preferred electronic hardware of a non-contact optical gauge of this invention.

The block diagram of FIG. 5 for the preferred processing circuit will now be described. The light sensor 201 and interrupter 202 feed into the signal conditioning amplifier 203 and squaring circuit 204 respectively. The outputs of these two circuits are then fed into the timing logic 205 to produce signals B, E, and D which are fed into individual counters designated counter 207. A crystal oscillator 206 provides the clock input into all three counters. Its frequency in conjunction with scanning speed also determines the resolution of the gauge's measurement capability.

The output of the counters 207 is fed into a microprocessor or processing means of this invention which preferably comprises a CPU 214 (central processing unit), signal processing program memory in ROM 212, learning program in ROM 213, signature coefficient or look-up table in non-volatile RAM 208 and I/O 209 for keyboard 211 and display 210 and configuration options, such as English/metric, and opaque/glass. In addition, a data and address buffer 215 is connected to external option modules 216 to provide the user with installable upgrades. The CPU is the brain that interprets the program instructions contained in the two ROM memories. Any general purpose microprocessor can be used. In the preferred embodiment, an Intel 8052 microcomputer is incorporated. The outputs of the processing means represent corrected measurements to a multi-digit display in a manner dictated by the keyboard. The keyboard contains, but is not limited to, switches for set point, actual outside diameter, deviation of diameter from set point, configuration inputs (communication protocol gauge identification, etc.), and relay tolerance set points. These can be individual switches or switches used in combination with each other to select a particular function. The data and address buffer 215 provides microprocessor signals accessible by the external option modules. These modules can transform the data into suitable outputs defined by the option module function. Functions such as, for example, analog voltage, alarm relay, parallel printer, control loops and a host of other features can be employed.

Figure 8:
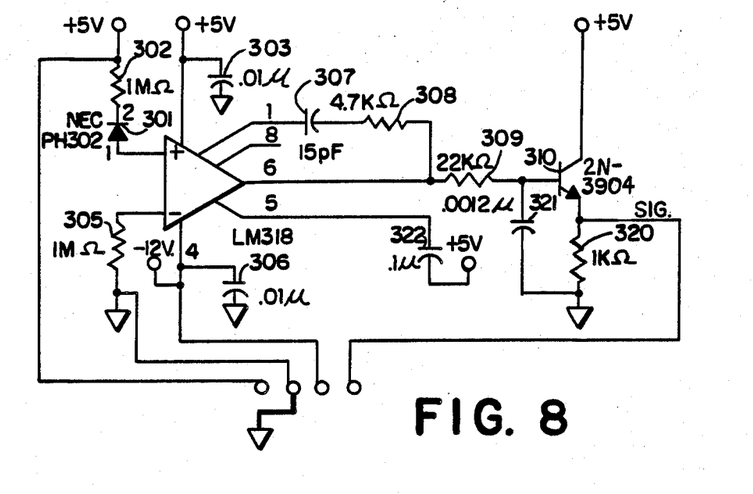
FIG. 8 is a preferred electrical schematic diagram for a sensor for the Preferred embodiment.
Figure 9:
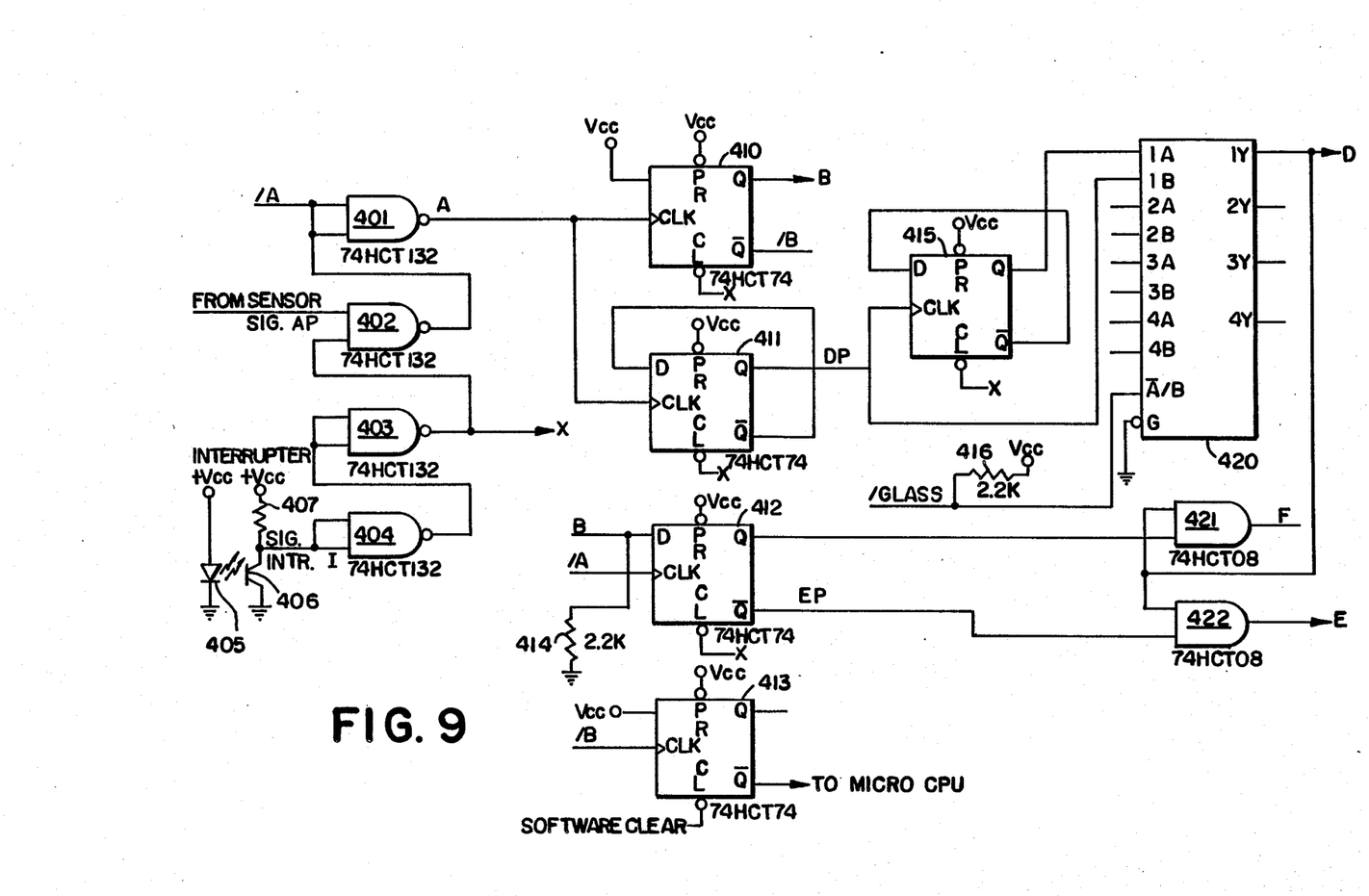
FIG. 9 is an electrical schematic diagram of a processor for the non-contact optical gauge of FIG. 1.

The preferred electrical schematic diagram of FIG. 9 will now be discussed. A signal generated by the optical measurement scanning device, a preferred schematic of which is described in FIG. 8, is introduced as SIG. AP at gate 402. Gates 401 through 404 are Schmitt trigger input NAND gates used for signal conditioning. Another input to the circuit comes from the interrupter called SIG. I. This interrupter can be an optical switch such as switch elements 405 and 406 or a magnetic switch that determines when the scanning slit is in the measurement window. Flip flops 410 through 412 are used to generate appropriate timing to determine the shadow area of the object and hence its indicated diameter. Flip-flop 413 signals the microprocessor when the measurement has been taken. The microprocessor then resets this flip flop for the next scanner revolution. Flip-flop 415 is used to detect the two opaque edges of a glass or transparent object. Multiplexer 420 can be provided to select the regular output signal of an opaque object from flip-flop 411 or the transparent signal from flip flop 415. AND gates 421 and 422 further define the pulse width of the shadow measurement. Signals B, D, and E are enable inputs to counters which the microprocessor reads to determine the indicated diameter.

Figure 9A:
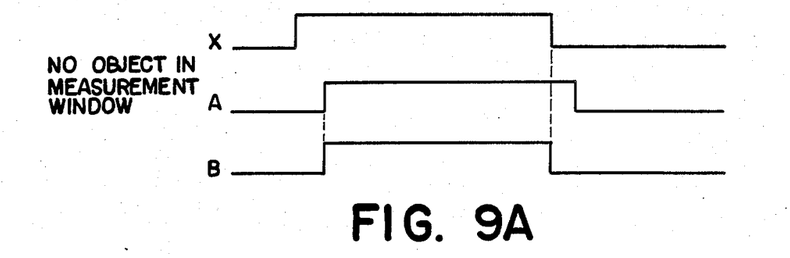
FIG. 9(a)–(c) illustrate timing signals for the preferred schematic of FIG. 9 for the incidence of no object, opaque object and transparent object in the measurement window.
Figure 9B:
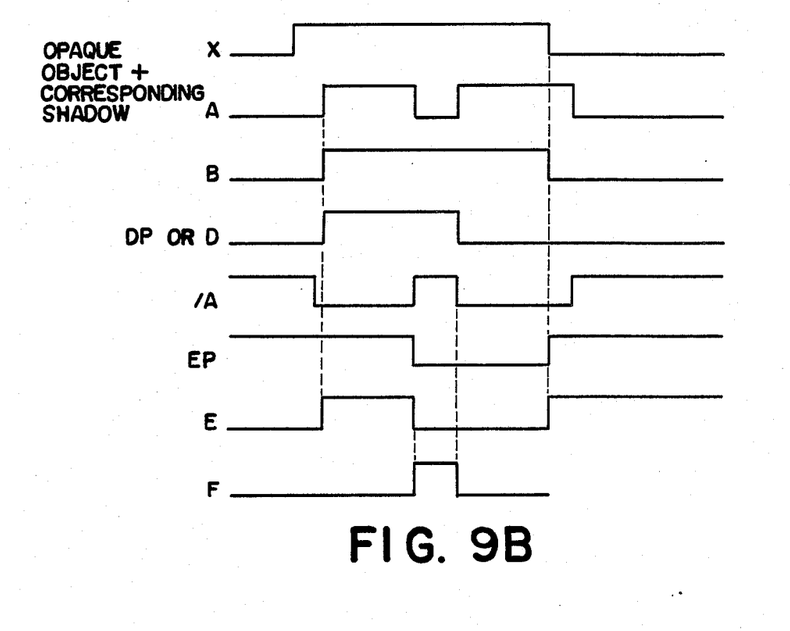

The operation of this circuitry will now be described. SIG. I passes through gates 404 and 403 where it is inverted twice with hysteresis to produce a condition signal called X. Further illustrated in timing diagrams 9 (a)–(c). X is used to enable the timing flip-flops 410, 411, 412 and 415, and then reset the flip-flops to prepare for the next revolution of the scanner. SIG. AP from the scanner passes through gate 402 where it is ANDED with X and then inverted as represented by /A. It is inverted again by 401 to produce the conditioned signal A. When no object is in the measurement window of the gauge, FIG. 9(a) represents the resultant signals A and B. B is the effective duration of the measurement window and is used to establish the measurement window on-time. In FIG. 9(b), an opaque object is placed in the measurement window, although it is understood that transparent or translucent objects can also be measured. Signal A shows the effect of the object's shadow as a negative going pulse whose duration indicates the diameter of the object. At the beginning of the measurement window, signal A clocks flip-flops 410 and 411 on the rising edge. The input to 410 is tied high and when clocked produces a continuous high output Q (signal B) until 410 is reset by X. Flip-flop 411 is configured as a toggle. When it is clocked the first time during a scan by signal A, its Q output goes high. The next high transition causes Q to go low. This is further explained by FIG. 9(b), signal DP. Signal DP represents the measurement signal from the beginning of the scan window to the trailing edge of the object's shadow. This signal DP is connected both to the flip-flop 415 and multiplexer 420. When the select signal /GLASS on multiplexer 420 is high, signal DP passes through the multiplexer 420 and becomes counter enable signal D. Signal DP also clocks flip-flop 415 when glass objects are measured. Referring to flip-flop 412, a high B signal causes signal output /Q (EP) to go low when the compliment of signal A (/A) goes high, as illustrated in FIG. 9(b). Signal EP, when ANDED with signal D produces signal E. Signal E represents the counter enable from the beginning of the scan window to the leading edge of the object under measurement. When the microprocessor subtracts E from D, the indicated diameter of the object is measured. Signal F is also the indicated diameter of the object derived through AND gate 421 and is used as a test point.

Figure 9C:
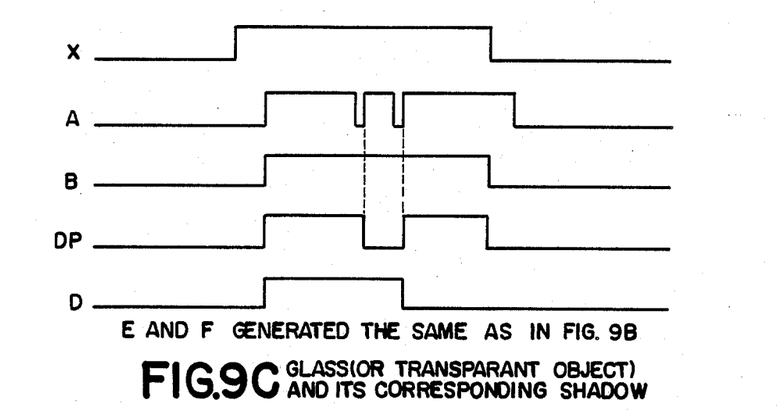

When a transparent or translucent object is measured, the circuitry works in a similar manner as discussed above. Referring now to FIG. 9(c), the difference when measuring transparent or translucent objects, is that the signal A comprises two negative going pulses instead of one. These two pulses, representing the two opaque edges or shadows of a transparent object, are combined to produce a signal D counter enable. Signal D then looks to the processor as one shadow and can be treated the same as the opaque case. In FIG. 9(c), signal A, comprised of three positive going edges, first clocks flip-flop 411 so Q is high. The second positive edge causes Q to go low. The third positive edge causes Q to stay high until reset X comes along. This output signal DP clocks flip flop 415 so that the first positive edge causes flip flop's 415 Q to go high. The second signal DP positive edge causes Q to go low and stay low. If the /GLASS line is selected low, E.G. by user switch or some other programable method, Q is routed through the multiplexer 420 to output signal D. The remaining signals B, E and F are achieved in the same manner as the opaque case.

The novel methods for measuring a dimension of an object pursuant to the teachings of this invention are as follows: first, a signature is memorized which indicates an error associated with measuring a known dimension. Then radiation is directed upon the object which produces an image received and converted into a signal responsive to the image. Then this signal is processed to provide at least an output which is indicative of the dimension of the object. During this processing step, the output is determined in relation to the previously memorized signature. The novel method can also include providing a vertically rotating drum having an aperture, two slits located approximately opposite each other on its surface and other configurations as previously discussed for the gauge device. The scanning step can include disposing the image and a portion of the radiation upon the vertically rotating drum. The transmitted light from the scanning can then be converted, e.g. through a photodetector, into an output signal. The processing step can comprise determining an off versus on time relationship of the photodetector. It also can include comparing the output with a signature signal compensated for at least one of optical, mechanical or electrical errors. With respect to mechanical errors, the processing step can correct the output in response to an error in alignment of greater than about 0.001", preferably greater than about 0.05" and most preferably greater than about 0.25". As in the case with the optical gauge, the processing step of the improved method can comprise averaging a plurality of light intensity readings taken by the photodetector, to compensate for skewing of the object to be measured. Similarly, both vertical and horizontal displacement of the object during the scanning step can be compensated for. Additionally, all of the previously discussed anomalies associated with non-contact optical measurement of dimensions can be compensated for using the novel methods of this invention, including correcting the dimensional output for imperfect collimation, vertical and horizontal displacement and skewing of the object.

The teachings of this invention can be employed in a variety of constructions. One such construction is a dual plane gauge design wherein a beam splitter and a right angle mirror pair are employed after a radiation source is passed through a drum scanner and prior to illuminating an object with radiation. In such an embodiment, collimated light can be separated in directions 90° apart to provide another measuring axis for the object.

In a separate construction, a multiple plane gauge can be employed by expanding upon the dual plane concept. In such an embodiment, multiple plane measurements can be achieved employing a multi-face beam splitter, a plurality of right angle mirror pairs and a plurality of lens-sensor receiver means. With modifications to the processing, a cross-section of an object, e.g. tube or rod can be displayed.

In another construction, a wall thickness gauge and method can be produced employing nuclear radiation, such as X-Ray radiation. By substituting an X-Ray radiation source and X-Ray sensitive sensor in the constructions previously described, a wall thickness of an object having interior cavities can be achieved. In such a way tubes and other cylinders can be measured. This idea can be further elaborated to produce a cross-sectional image of an object by using an X-Ray radiation source and multiple plane configuration as previously discussed. With suitable processing, a real time image of the cross-section of the opaque tube can be displayed on a CRT for visual inspection and process.

Figure 1A:
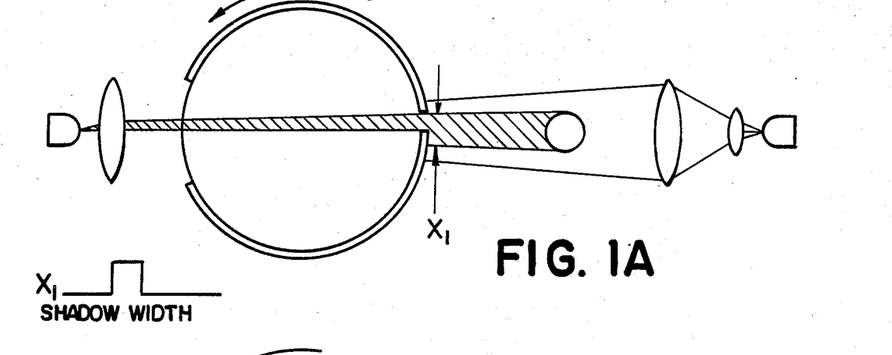
FIG. 1(a) and (b) are diagrammatic, side views of a preferred non-contact optical gauge designed to compensate for imperfect collimation of light.
Figure 1B:
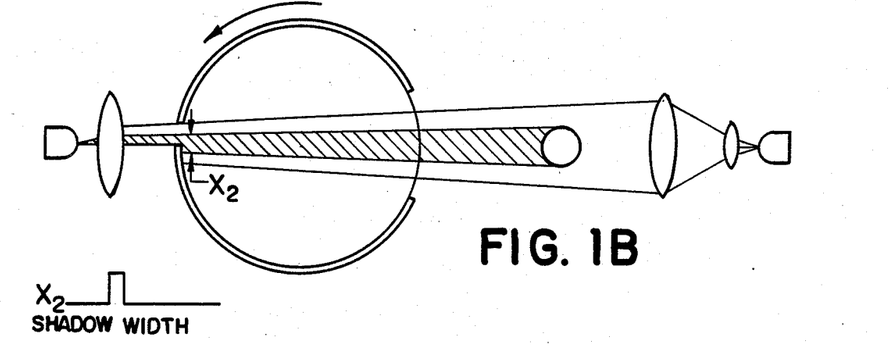

In still another construction, a device can be constructed for correcting for a non-parallel bundle of light as a result of imperfect collimation. Using similar software correction techniques, as previously discussed, in conjunction with a vertical drum, a low cost design can be fabricated for overcoming imperfect collimation. This feature is generally desirable, because most other methods of collimation rely on costly and nearly perfect alignment of optics and focused light sources. In this alternative construction, a vertical drum having a small slit on one side and a large opening, e.g. larger than the width of the light beam, 180° away from the slit. The focusing lens and sensor of this embodiment would be located behind the drum instead of the preferred position inside the drum. The large opening would therefore allow the sensor to see the slit in both the leading edge and the trailing edge of the light. In the case where the light bundle converges from the light source, the image of the object ($X_1$) would be larger when the slit passes within the non-parallel light bundle close to the object, per FIG. 1(a). Accordingly, the image ($X_2$) would be smaller when the slit passes through the non-parallel light bundle 180° away from the first point, per FIG. 1(b). By taking a measurement at the leading and trailing edge of the light path relative to the drum diameter, any convergence, or divergence for that matter, results in two different measurement values. It is further understood that as the object under measurement is moved horizontally, the leading and trailing measurements would also change. The relationship between these measurements can be used to establish a correction factor for imperfect collimation. The correction factor can be established using the "learning mode" discussed earlier. By moving samples of varying diameter back and forth horizontally as the gauge is measured, a signature can be obtained for the collimation anomaly. The relationship between the measurements at the leading and trailing edges versus the horizontal position in the measuring window can be captured and stored in non-volatile memory for later recall during actual measurement processing.

From the foregoing, it can be realized that this invention provides a non-contact optical gauge and method for providing accurate outside diameter, wall thickness and other dimensional measurements with a high degree of accuracy. The invention departs from the current art by introducing a learning mode to compensate for inherent inaccuracies and non-linearities of the optical-/mechanical/electrical system. This enables the device to be manufactured using less stringent component quality and precision to provide a low-cost, low heat design approach to optical, non-contact measuring gauges and methods. Although various embodiments have been illustrated, this was for the purpose of describing but not limiting the invention. Various modifications, which will become apparent to one skilled in the art, are within the scope of this invention described in the attached claims.

| Optical Measurement Scanner (FIG. 8) | | |
|---|---|---|
| ITEM NO. | NAME | VALUE DESCRIPTION. ETC. |
| 301 | Photodiode | NEC PH 302 |
| 302 | Resistor | 1 MΩ |
| 303 | Capacitor | .01 μf |
| 305 | Resistor | 1 MΩ |
| 306 | Capacitor | .01 μf |
| 307 | Capacitor | 15 pf |
| 308 | Resistor | 4.7K Ω |
| 309 | Resistor | 22K Ω |
| 310 | Transistor | 2N3904 |
| 320 | Resistor | 1K Ω |
| 321 | Capacitor | .0012 μf |
| 322 | Capacitor | .1 μf |

| Processing Circuit (FIG. 9) | | |
|---|---|---|
| ITEM NO. | NAME | VALUE DESCRIPTION. ETC. |
| 401 | NAND Gate | 74 HCT 132 |
| 402 | NAND Gate | 74 HCT 132 |
| 403 | NAND Gate | 74 HCT 132 |
| 404 | NAND Gate | 74 HCT 132 |
| 405 | L.E.D. | |
| 406 | Phototransistor | Interrrupter Module |
| 407 | Resistor | 120 Ω |
| 410 | Flip-flop | 74 HCT 74 |
| 411 | Flip-flop | 74 HCT 74 |
| 412 | Flip-flop | 74 HCT 74 |
| 413 | Flip-flop | 74 HCT 74 |
| 415 | Flip-flop | 74 HCT 74 |
| 416 | Resistor | 2.2K Ω |
| 420 | Multiplexer | 74 HCT 157 |
| 421 | AND Gate | 74 HCT 08 |
| 422 | AND Gate | 74 HCT 08 |

What is claimed is:

1. A non-contact, device for measuring a dimension of an object comprising:
   (a) storage means for memorizing a signature indicative of an error associated with measuring a known dimension;
   (b) radiation source means for directing radiation upon said object;

(c) scanning means for receiving an image of said object produced by said radiation and for producing a signal responsive to said image, said scanning means comprising rotating drum means having an aperture therein disposed to pass nonlinearly through said image; and (d) processing means for receiving said signal from said scanning means and for producing at least an output which is indicative of the dimension of said object, said processing means determining said output in relation to said signature.

2. The device of claim 1 wherein said radiation source means comprises means for generating light.

3. The device of claim 1 wherein said radiation source means comprises means for generating laser light.

4. The device of claim 1 wherein said radiation source means comprises means for generating X-rays.

5. The device of claim 1 wherein said radiation source means comprises means for generating infrared light.

6. The device of claim 5 wherein said radiation source means comprises a light-emitting-diode.

7. The device of claim 1 wherein said radiation source means comprises collimation means for collimating said radiation.

8. The device of claim 7 wherein said collimation means comprises condensing means for condensing said radiation produced by said radiation source means.

9. The device of claim 8 wherein said condensing means comprises a plurality of condensing lenses.

10. The device of claim 9 wherein said condensing means further comprises an objective lens.

11. The device of claim 1 wherein said scanning means comprises a vertically rotating drum.

12. The device of claim 11 wherein said vertically rotating drum comprises a horizontal slit.

13. The device of claim 11 wherein said scanning means further comprises a focusing lens.

14. The device of claim 11 wherein said vertical rotating drum comprises two slits placed approximately opposite each other on said vertically rotating drum.

15. The device of claim 14 wherein each of said slits is angled with respect to an axis of rotation of said vertically rotating drum.

16. The device of claim 15 wherein each of said slits is angularly disposed in an opposite direction to the other.

17. The device of claim 16 wherein said slits are placed 180° apart on said drum.

18. The device of claim 1 wherein said scanning means further comprises receiver means for receiving radiation transmitted through said scanning means.

19. The device of claim 19 wherein said receiver means comprises a photodetector.

20. The device of claim 19 wherein said photodetector comprises an infrared sensor.

21. The device of claim 18 wherein said processing means comprises means for determining an off versus on time relationship of said receiver means.

22. The device of claim 1 wherein said processing means comprises means for correcting said output in response to a misalignment within said device of greater than about 0.001 inches.

23. The device of claim 1 wherein said processing means comprises means for correcting said output in response to a misalignment in said device of greater than about 0.05 inches.

24. The device of claim 1 wherein said processing means comprises means for correcting said output in response to a misalignment in said device of greater than about 0.250 inches.

25. The device of claim 1 wherein said processing means comprises means for averaging a plurality of light intensity readings.

26. The device of claim 7 wherein said processing means comprises means for correcting said output for imperfect collimation.

27. The device of claim 1 wherein said processing means comprises means for correcting said output by comparing said output to a signature signal compensated for at least one of optical, mechanical or electrical errors.

28. The device of claim 1 wherein said processing means comprises means for correcting said output for a vertical displacement of said object within said device.

29. The device of claim 1 wherein said processing means comprises means for correcting said output for a horizontal displacement of said object within said device.

30. A method for measuring a dimension of an object, comprising:
(a) memorizing a signature indicative of an error associated with measuring a known dimension;
(b) directing radiation upon said object;
(c) non-linearly scanning said image of said object produced by said radiation with a rotating drum means to provide a plurality of scanned readings;
(d) providing a signal responsive to said scanned readings; and
(e) processing said signal from said providing step (d) to provide at least an output which is indicative of the dimension of said object, said processing step (d) determining said output in relation to said signature.

31. The method of claim 30, wherein said scanning step (c) comprises providing a vertically rotating drum having an aperture therethrough.

32. The method of claim 31 wherein said scanning step (c) comprises disposing said image and a portion of said radiation upon said vertically rotating drum.

33. The method of claim 30, wherein said scanning step (c) comprises providing a vertically rotating drum having two slits located approximately opposite each other on said vertically rotating drum.

34. The method of claim 30, wherein said providing step (d) comprises providing a photodetector for converting at least a portion of said radiation into an output signal.

35. The method of claim 34, wherein the step of processing (e) comprises determining an off versus on time relationship of said photodetector.

36. The method of claim 30, wherein the step of processing (e) comprises comparing said output with a signature signal compensated for at least one of optical, mechanical or electrical errors.

37. The method of claim 30, wherein said processing step (e) further comprises correcting said output of said processing step in response to an error in alignment of greater than about 0.001 inches.

38. The method of claim 30, wherein the step of processing further comprises correcting said output of said processing step in response to an error in alignment of greater than about 0.05 inches.

39. The method of claim 30, wherein the step of processing further comprises correcting said output in response to an error in alignment of greater than about 0.25 inches.

40. The method of claim 30 comprising collimating said radiation and, correcting said output of said processing step (e) for imperfect collimation.

41. The method of claim 30, wherein said step of processing (e) further comprises correcting said output for a vertical displacement of said object during said scanning step (c).

42. The method of claim 30, wherein said step of processing (e) further comprises correcting said output for a horizontal displacement of said object during said scanning step (c).

43. The method of claim 34 comprising providing a plurality of radiation intensity readings with said photodetector and averaging said radiation intensity readings.

44. The method of claim 30, wherein said step of directing step (b) disposes X-ray radiation upon said object.

* * * * *